United States Patent
Chu et al.

(10) Patent No.: US 10,402,635 B2
(45) Date of Patent: Sep. 3, 2019

(54) ELECTRONIC DEVICE HAVING SUPPORTING COMPONENT

(71) Applicants: Shu-Hsien Chu, Taipei (TW);
Wang-Hung Yeh, Taipei (TW);
Hsin-Chieh Fang, Taipei (TW);
Ping-Chu Tsai, Taipei (TW);
Ching-Shiang Chang, Taipei (TW)

(72) Inventors: Shu-Hsien Chu, Taipei (TW);
Wang-Hung Yeh, Taipei (TW);
Hsin-Chieh Fang, Taipei (TW);
Ping-Chu Tsai, Taipei (TW);
Ching-Shiang Chang, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 15/987,920

(22) Filed: May 24, 2018

(65) Prior Publication Data

US 2018/0340648 A1 Nov. 29, 2018

Related U.S. Application Data

(60) Provisional application No. 62/510,738, filed on May 24, 2017.

(51) Int. Cl.
*G06F 1/16* (2006.01)
*H05K 5/00* (2006.01)
(Continued)

(52) U.S. Cl.
CPC ....... *G06K 9/00369* (2013.01); *F16M 13/005* (2013.01); *G03B 17/02* (2013.01);
(Continued)

(58) Field of Classification Search
CPC .... G06F 1/1607; G06F 1/1613; G06F 1/1616; G06F 1/1633; G06F 1/1675
(Continued)

(56) References Cited

U.S. PATENT DOCUMENTS 6,353,529 B1 3/2002 Cies
8,520,377 B2 * 8/2013 Senatori ................ G06F 1/1637
361/679.26
(Continued)

FOREIGN PATENT DOCUMENTS

CN 202838112 3/2013
CN 104508345 4/2015
(Continued)

OTHER PUBLICATIONS

"Office Action of Taiwan Counterpart Application", dated Aug. 28, 2018, p. 1-p. 5.

Primary Examiner — Anthony M Haughton
(74) Attorney, Agent, or Firm — JCIPRNET

(57) ABSTRACT

An electronic device includes a base, a pivoting component, a display and a supporting component. The base has an upper side and a lower side and is suitable to be placed on a surface. The pivoting component is pivotally connected to a rear end of the base. The display is connected to the pivoting component and suitable to be unfolded or closed at the upper side of the base by the pivoting of the pivoting component. The supporting component is pivotally connected to the lower side of the base and suitable to be unfolded or closed at the lower side of the base. When the display is unfolded on the base, an end of the display slides along the supporting component, and the supporting component is unfolded on the base and supports the pivoting component and the rear end of the base away from the surface.

8 Claims, 4 Drawing Sheets

(51) Int. Cl.
*H05K 7/00* (2006.01)
*G06K 9/00* (2006.01)
*F16M 13/00* (2006.01)
*G03B 17/02* (2006.01)
*G06F 3/041* (2006.01)
*H04N 5/232* (2006.01)

(52) U.S. Cl.
CPC .......... *G06F 1/1607* (2013.01); *G06F 3/0416* (2013.01); *H04N 5/23216* (2013.01)

(58) Field of Classification Search
USPC ............ 361/679.26–679.29, 679.08, 679.09, 361/679.11, 679.12, 679.2
See application file for complete search history.

(56) References Cited

U.S. PATENT DOCUMENTS

| 8,971,030 | B2 | 3/2015 | Chen et al. |
| 2012/0188726 | A1 | 7/2012 | Nonaka et al. |

FOREIGN PATENT DOCUMENTS

| TW | I416954 | 11/2013 |
| TW | 201442599 | 11/2014 |

\* cited by examiner

ELECTRONIC DEVICE HAVING SUPPORTING COMPONENT

CROSS-REFERENCE TO RELATED APPLICATION

This application claims the priority benefit of U.S. provisional application Ser. No. 62/510,738, filed on May 24, 2017. The entirety of the above-mentioned patent application is hereby incorporated by reference herein and made a part of this specification.

BACKGROUND OF THE INVENTION

1. Field of the Invention

The present invention relates to an electronic device, in particular, to an electronic device having a supporting component.

2. Description of Related Art

With the development of the electronic industry, flat panel displays have gradually become the mainstream of displays. In the flat panel displays, the technology of the liquid crystal display is the most mature and popular one, and it can be applied to electronic devices such as a notebook computer, a tablet PC, and a smart phone.

In the case of a notebook computer or a tablet PC integrated with a docking station, when the screen end (such as a screen of a notebook computer or a tablet PC) is unfolded relative to a host end (such as a host of the notebook computer or a docking station corresponding to the tablet PC), the overall device may be tilted backwards because of the unstable centre of gravity due to the weight of the screen end. In addition, in order to enable a user to comfortably operate the electronic device, a tripod is generally disposed on the back surface of the screen end, but the tripod unfolding backward from the screen end occupies more space.

SUMMARY OF THE INVENTION

The present invention provides an electronic device that can avoid unstable centre of gravity and can save placement space.

The electronic device of the present invention includes a base, a pivoting component, a display and a supporting component. The base has an upper side and a lower side opposite to each other and is suitable to be placed on a surface. The pivoting component is pivotally connected to a rear end of the base. The display is connected to the pivoting component and suitable to be unfolded or closed at the upper side of the base by the pivoting of the pivoting component. The supporting component is pivotally connected to the lower side of the base and suitable to be unfolded or closed at the lower side of the base. When the display is unfolded on the base, an end of the display slides along the supporting component, and the supporting component is unfolded on the base and supports the pivoting component and the rear end of the base away from the surface.

In an embodiment of the present invention, the supporting component has a convex portion, and when the display is unfolded on the base, the end of the display bears against the convex portion.

In an embodiment of the present invention, the convex portion has a slope, and the end of the display is suitable to bear against the slope.

In an embodiment of the present invention, the electronic device includes two magnetic components, wherein the two magnetic components are respectively configured on the end of the display and the supporting component, and when the display is unfolded on the base, the end of the display slides along the supporting component to align the two magnetic components with each other, and magnetic attraction occurs between the two magnetic components.

In an embodiment of the present invention, the pivoting component has a protruding portion, the display has a slot, and the protruding portion is suitable to be inserted into the slot so that the display is connected to the pivoting component.

In an embodiment of the present invention, the base has a front end opposite to the rear end, the supporting component has a pivoting end and a free end opposite to each other and is pivotally connected to the lower side of the base by the pivoting end, and when the display is unfolded on the base, the free end of the supporting component and the front end of the base are supported on the surface, and the pivoting end of the supporting component is supported away from the surface.

In an embodiment of the present invention, the supporting component has a pivoting end and a free end opposite to each other and is pivotally connected to the lower side of the base by the pivoting end, and when the display is unfolded on the base, the end of the display slides from the free end towards the pivoting end.

In an embodiment of the present invention, when the display is closed to the base, the pivoting component is closed to the supporting component.

Based on the above, the supporting component of the electronic device of the present invention is pivotally connected to the lower side of the base, and can be driven as the display is unfolded relative to the base so as to support the rear end of the base up. Accordingly, by the front end of the base and the free end of the supporting component, the electronic device is stably supported on the surface on which it is placed without being unstable in centre of gravity. In addition, since the supporting component is disposed on the lower side of the base rather than on the back surface of the display, it does not occupy the space on the back surface of the display.

In order to make the aforementioned and other objectives and advantages of the present invention comprehensible, embodiments accompanied with figures are described in detail below.

DESCRIPTION OF THE EMBODIMENTS

Figure 1A:
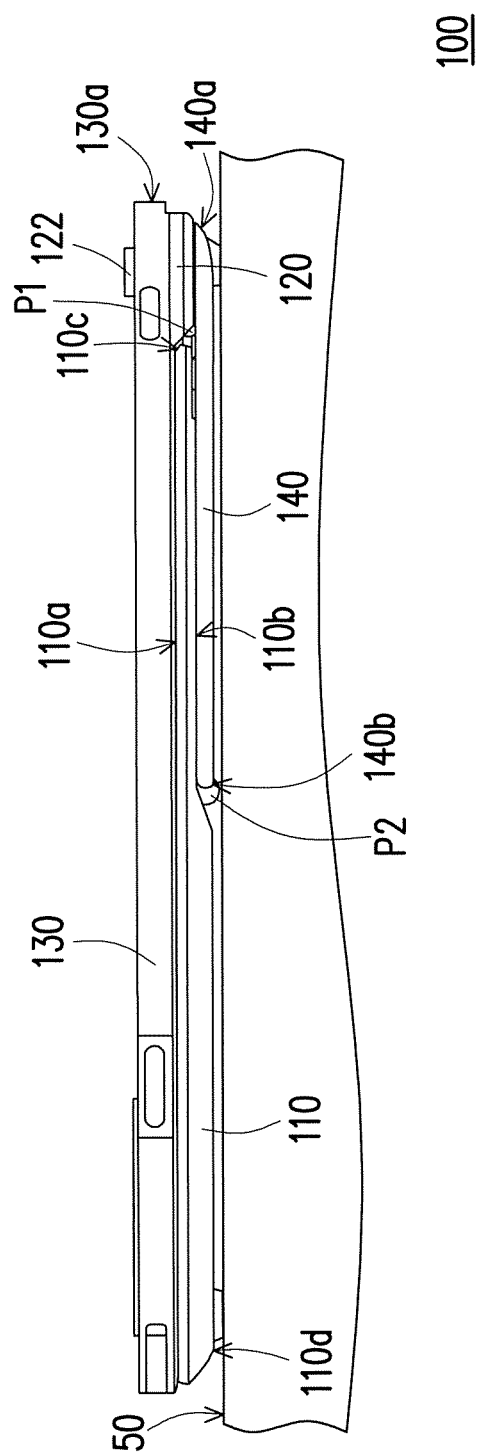
FIG. 1A to FIG. 1C are operation flowcharts of an electronic device according to an embodiment of the present invention.
Figure 1B:
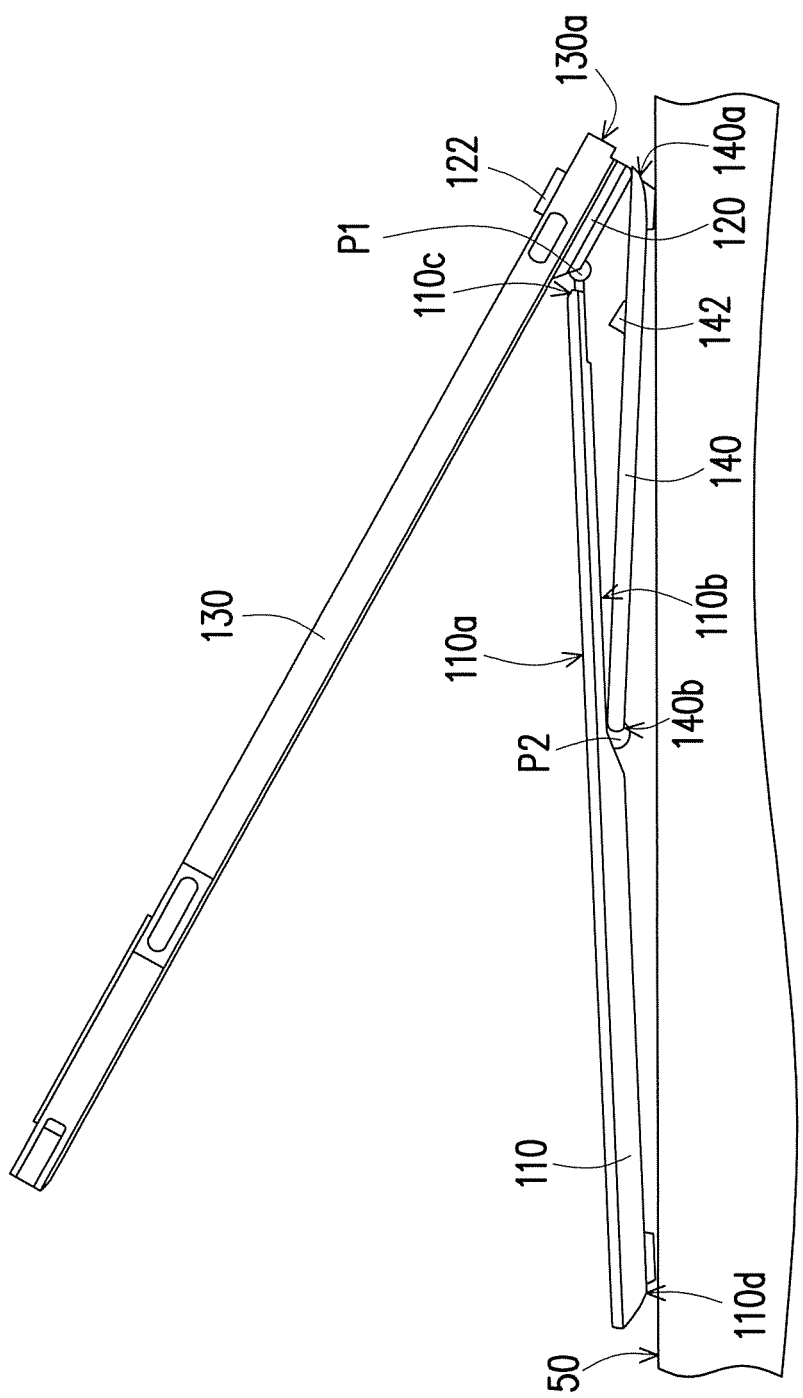
Figure 1C:
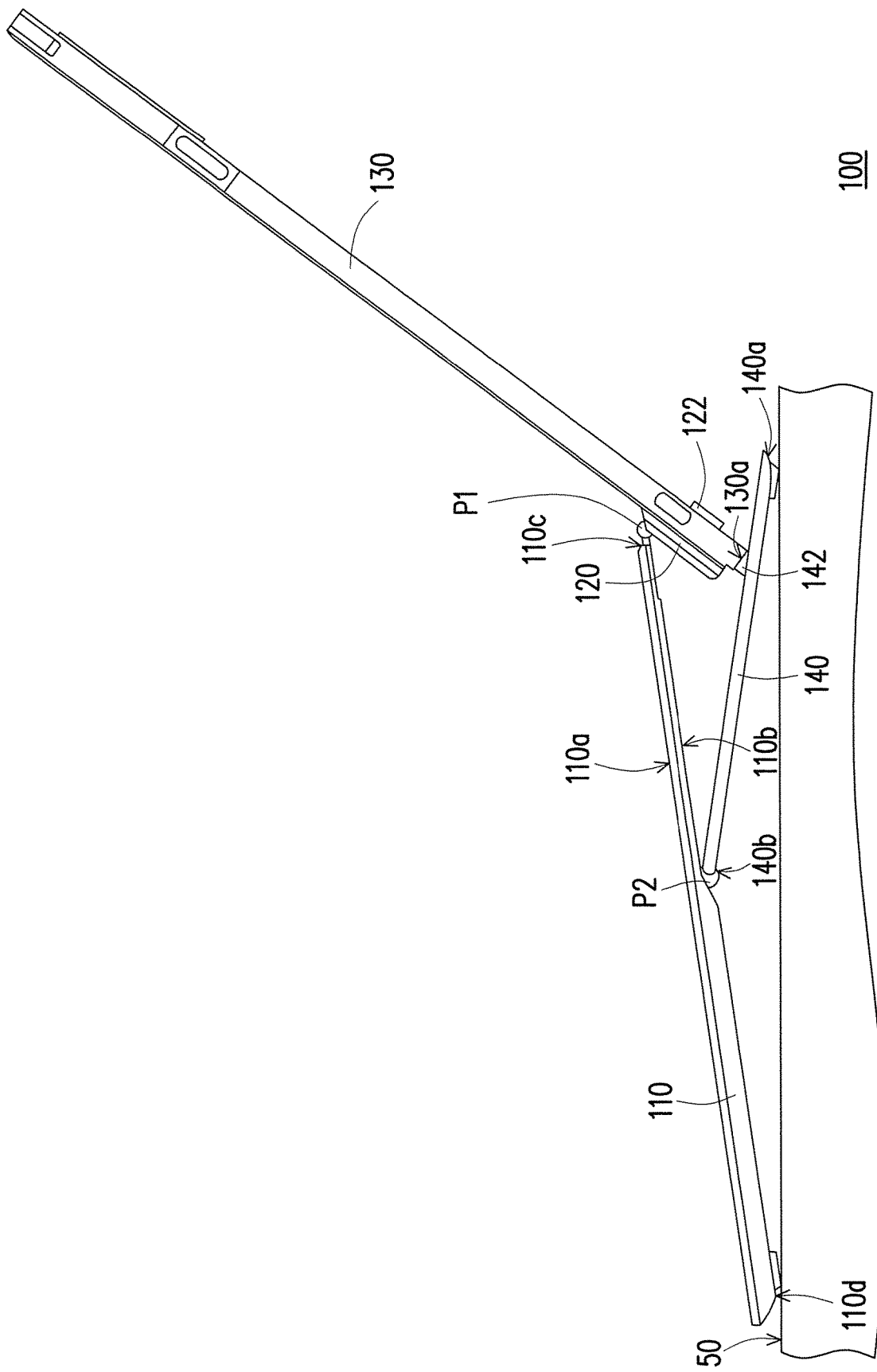

FIG. 1A to FIG. 1C are operation flowcharts of an electronic device according to an embodiment of the present invention. Referring to FIG. 1A to FIG. 1C, the electronic device 100 of the present embodiment includes a base 110, a pivoting component 120, a display 130 and a supporting component 140. The display 130 of the present embodiment is, for example, a tablet PC, and the base 110 is a docking station corresponding thereto. In other embodiments, the display 130 may be a screen of a notebook computer, and the base 110 may be a host of the notebook computer, which is not limited by the present invention.

The base 110 has an upper side 110a and a lower side 110b opposite to each other and is suitable to be placed on a surface 50 (such as a desktop). The pivoting component 120 is pivotally connected to a rear end 110c of the base 110 through a pivot P1. The display 130 is connected to the pivoting component 120 and suitable to be unfolded at the upper side 110a of the base 110 as shown in FIG. 1C or closed to the upper side 110a of the base 110 as shown in FIG. 1A by the pivoting of the pivoting component 120. The supporting component 140 is pivotally connected to the lower side 110b of the base 110 through a pivot P2 on the pivoting end 140b thereof, and suitable to be unfolded at the lower side 110b of the base 110 as shown in FIG. 1C or closed to the lower side 110b of the base 110 as shown in FIG. 1A.

When the display 130 is closed to the base 110 as shown in FIG. 1A, the supporting component 140 is closed to the base 110, and the pivoting component 120 is closed to the supporting component 140. When the display 130 is unfolded on the base 110 as shown in FIG. 1A to FIG. 1C, an end 130a of the display 130 slides along the supporting component 140 from a position (where the free end 140a of the supporting component 140 is located) shown in FIG. 1B towards the pivoting end 140b of the supporting component 140 to reach a position shown in FIG. 1C, and the supporting component 140 is unfolded on the base 110 as shown in FIG. 1C and supports the rear end 110c of the base 110 away from the surface 50, so that the base 110 has a proper inclination for the user to comfortably operate. In the state shown in FIG. 1C, the free end 140a of the supporting component 140 and the front end 110d of the base 110 are supported on the surface 50, and the pivoting end 140b of the supporting component 140 is supported away from the surface 50.

As described above, the supporting component 140 can be driven as the display 130 is unfolded relative to the base 110 so as to support the rear end 110c of the base 110 up. Accordingly, by the front end 110d of the base 110 and the free end 140a of the supporting component 140, the electronic device 100 is stably supported on the surface 50 on which it is placed without being unstable in centre of gravity. In addition, since the supporting component 140 is disposed on the lower side 110b of the base 110 rather than on the back surface of the display 130, it does not occupy the space on the back surface of the display 130.

Figure 2:
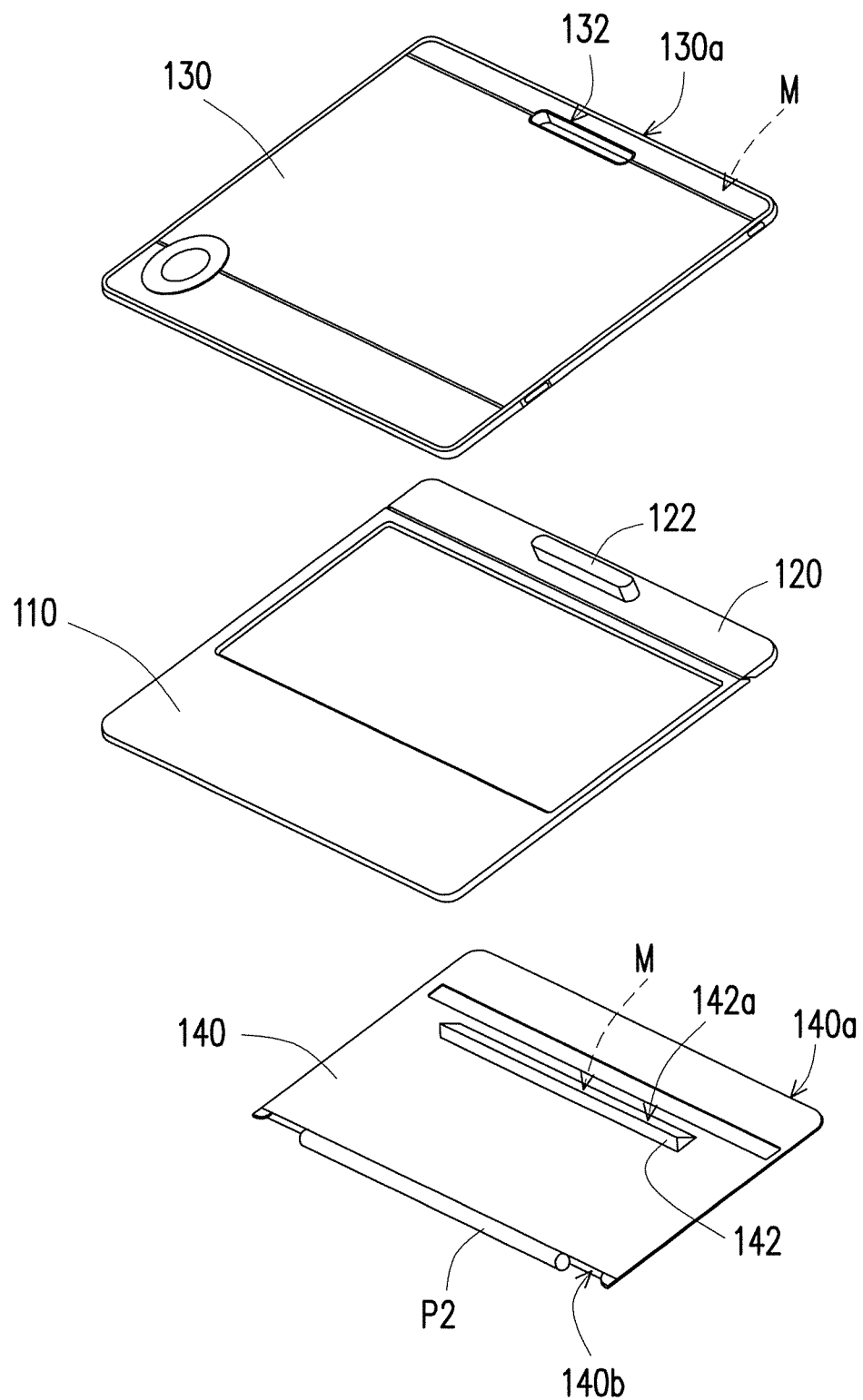
FIG. 2 is an exploded view of the electronic device of FIG. 1.

FIG. 2 is an exploded view of the electronic device of FIG. 1. Referring to FIG. 2, the supporting component 140 of the present embodiment has a convex portion 142, and the convex portion 142 has a slope 142a. When the display 130 is unfolded on the base 110 as shown in FIG. 1C, the end 130a of the display 130 bears against the slope 142a of the convex portion 142, so that the display 130 is stably maintained in the state shown in FIG. 1C. In addition, the two magnetic components M may be respectively configured in the end 130a of the display 130 and in the convex portion 142 of the supporting component 140, so that when the display 130 is unfolded on the base 110 as shown in FIG. 1C, the end 130c of the display 130 slides along the supporting component 140 to align the two magnetic components M with each other, and magnetic attraction occurs between the two magnetic components M to stably locate the display 110 and the supporting component 140.

As shown in FIG. 2, in the present embodiment, the pivoting component 120 has a protruding portion 122, the display 130 has a slot 132, and the protruding portion 122 is suitable to be inserted into the slot 132 so that the display 130 is connected to the pivoting component 120. The protruding portion 122 is, for example, provided with an electrical connection interface, so that the display 130 is electrically connected with the base 110 through the pivoting component 120. In other embodiments, the display 130 may be connected to the pivoting component 120 by other proper manners, which is not limited by the present invention.

Based on the foregoing, the supporting component of the electronic device of the present invention is pivotally connected to the lower side of the base, and can be driven as the display is unfolded relative to the base so as to support the rear end of the base up. Accordingly, by the front end of the base and the free end of the supporting component, the electronic device is stably supported on the surface on which it is placed without being unstable in centre of gravity. In addition, since the supporting component is disposed on the lower side of the base rather than on the back surface of the display, it does not occupy the space on the back surface of the display.

Although the present invention has been disclosed with the above embodiments, it is not intended to limit the present invention. Any person having ordinary skill in the art can make some changes and modifications without departing from the spirit and scope of the present invention. Therefore, the protection scope of the present invention shall be defined by the appended claims.

What is claimed is:

1. An electronic device, comprising:
 a base, comprising an upper side and a lower side opposite to each other and suitable to be placed on a surface;
 a pivoting component, pivotally connected to a rear end of the base;
 a display, connected to the pivoting component and suitable to be unfolded or closed at the upper side of the base by the pivoting of the pivoting component; and
 a supporting component, pivotally connected to the lower side of the base and suitable to be unfolded or closed at the lower side of the base, wherein when the display is unfolded on the base, an end of the display slides along the supporting component, and the supporting component is unfolded on the base and supports the rear end of the base away from the surface.

2. The electronic device according to claim 1, wherein the supporting component comprises a convex portion, and when the display is unfolded on the base, the end of the display bears against the convex portion.

3. The electronic device according to claim 2, wherein the convex portion comprises a slope, and the end of the display is suitable to bear against the slope.

4. The electronic device according to claim 1, comprising two magnetic components, wherein the magnetic components are respectively configured on the end of the display and the supporting component, and when the display is unfolded on the base, the end of the display slides along the supporting component to align the two magnetic components with each other, and magnetic attraction occurs between the two magnetic components.

5. The electronic device according to claim 1, wherein the pivoting component comprises a protruding portion, the display comprises a slot, and the protruding portion is suitable to be inserted into the slot so that the display is connected to the pivoting component.

6. The electronic device according to claim 1, wherein the base comprises a front end opposite to the rear end, the supporting component comprises a pivoting end and a free end opposite to each other and is pivotally connected to the lower side of the base by the pivoting end, and when the display is unfolded on the base, the free end of the supporting component and the front end of the base are supported on the surface, and the pivoting end of the supporting component is supported away from the surface.

7. The electronic device according to claim 1, wherein the supporting component comprises a pivoting end and a free end opposite to each other and is pivotally connected to the lower side of the base by the pivoting end, and when the display is unfolded on the base, the end of the display slides from the free end towards the pivoting end.

8. The electronic device according to claim 1, wherein when the display is closed to the base, the pivoting component is closed to the supporting component.

* * * * *